US008345758B2

(12) United States Patent
Jeon

(10) Patent No.: US 8,345,758 B2
(45) **Date of Patent: *Jan. 1, 2013**

(54) METHOD OF DERIVING A MOTION VECTOR OF A BI-PREDICTIVE BLOCK BASED ON A MOTION VECTOR OF A CO-LOCATED BLOCK IN A REFERENCE PICTURE

(75) Inventor: Byeong Moon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 1120 days.

This patent is subject to a terminal disclaimer.

(21) Appl. No.: 12/285,545

(22) Filed: Oct. 8, 2008

(65) Prior Publication Data

US 2009/0074062 A1 Mar. 19, 2009

Related U.S. Application Data

(62) Division of application No. 11/044,002, filed on Jan. 28, 2005, now Pat. No. 7,606,307, which is a division of application No. 10/338,283, filed on Jan. 6, 2003, now Pat. No. 7,233,621.

(30) Foreign Application Priority Data

| | | |
|---|---|---|
| Oct. 4, 2002 | (KR) | 2002-60742 |
| Oct. 8, 2002 | (KR) | 2002-61243 |
| Nov. 15, 2002 | (KR) | 2002-71226 |

(51) Int. Cl.
*H04N 7/12* (2006.01)
*G06K 9/36* (2006.01)

(52) U.S. Cl. .................................. 375/240.15; 382/236

(58) Field of Classification Search ............. 375/240.01, 375/240.15, 240.16, 240.12; 382/236, 238
See application file for complete search history.

(56) References Cited

U.S. PATENT DOCUMENTS 6,215,823 B1 4/2001 Kim et al.

(Continued)

FOREIGN PATENT DOCUMENTS

EP 0 863 674 9/1998

(Continued)

OTHER PUBLICATIONS

U.S. Office Action mailed Jan. 30, 2009 for corresponding U.S. Appl. No. 11/907,074.

(Continued)

*Primary Examiner* — Gims Philippe

(74) *Attorney, Agent, or Firm* — Harness, Dickey & Pierce, P.L.C.

(57) ABSTRACT

In one embodiment, the method includes selecting a list 0 motion vector of the co-located block in a first reference picture if the co-located block has the list 0 motion vector and a list 1 motion vector. The first reference picture is a type of reference picture permitted to be located temporally before or after the current picture, and the selected list 0 motion vector points to a second reference picture which is a reference picture of the first reference picture. The method further includes deriving the list 0 and list 1 motion vectors of the bi-predictive block based on the selected list 0 motion vector of the co-located block. The deriving includes deriving a first temporal distance from a difference between the current picture and the first reference picture, deriving a second temporal distance from a difference between the first reference picture and the second reference picture, and scaling the selected list 0 motion vector of the co-located block based on the first and second temporal distances.

1 Claim, 13 Drawing Sheets

U.S. PATENT DOCUMENTS

| | | | | |
|---|---|---|---|---|
| 6,404,813 | B1 | 6/2002 | Haskell et al. | |
| 6,654,420 | B1 * | 11/2003 | Snook | 375/240.16 |
| 7,003,035 | B2 * | 2/2006 | Tourapis et al. | 375/240.12 |
| 7,463,685 | B1 | 12/2008 | Haskell et al. | |
| 7,558,321 | B2 | 7/2009 | Jeon | |
| 7,660,353 | B2 * | 2/2010 | Wang et al. | 375/240.12 |
| 7,940,845 | B2 * | 5/2011 | Kondo et al. | 375/240.16 |
| 2001/0012403 | A1 | 8/2001 | Takizawa et al. | |
| 2003/0005015 | A1 | 1/2003 | Chen | |
| 2003/0005051 | A1 | 1/2003 | Gottlieb | |
| 2004/0001545 | A1 * | 1/2004 | Chang | 375/240.12 |
| 2004/0001546 | A1 | 1/2004 | Tourapis et al. | |
| 2004/0057520 | A1 | 3/2004 | Sun | |
| 2004/0136461 | A1 | 7/2004 | Kondo et al. | |
| 2005/0129118 | A1 | 6/2005 | Jeon | |
| 2005/0129119 | A1 | 6/2005 | Jeon | |
| 2005/0129120 | A1 | 6/2005 | Jeon | |
| 2008/0031332 | A1 | 2/2008 | Jeon | |
| 2008/0037640 | A1 | 2/2008 | Jeon | |

FOREIGN PATENT DOCUMENTS

| | | | |
|---|---|---|---|
| EP | 0 863 674 | A2 | 9/1998 |
| EP | 0 986 261 | A2 | 3/2000 |
| EP | 1 460 450 | | 4/2004 |
| EP | 1 422 946 | A1 | 5/2004 |
| JP | 2002-027414 | A | 1/2002 |
| JP | 2004-208258 | | 7/2004 |
| KR | 10-1999-0015907 | | 3/1999 |
| KR | 10-2000-0008513 | | 2/2000 |
| RU | 2119727 | C1 | 9/1998 |
| RU | 2182727 | C2 | 5/2002 |
| WO | WO 99/38331 | | 7/1999 |
| WO | WO 01/33864 | | 5/2001 |

OTHER PUBLICATIONS

"Joint Final Committee Draft (JFCD) of Joint Video Specification (ITU-T Rec. H.264 | ISO/IEC 14496-10 AVC)." Joint Video Team (JVT) of ISO/IEC MPEG and ITU-T VCEG. 4th Meeting: Klagenfurt, Austria, Jul. 22-26, 2002.

Japanese Patent Office Action dated Jul. 11, 2005.

UK Search Report dated Aug. 23, 2005.

Working Draft No. 2, Revision 2 (WD-2) Joint Video Team (JVT) of ISO/IEC MPEG (MPEG-4 Part 10 AVC) and ITU-T VCEG (H.26L), Geneva; Mar. 15, 2002; pp. 1-106, XP002245569; paragraph 7.4.2.

"Text of Final Committee Draft of Joint Video Specification (ITU-T Rec.H264/ISO/IEC 14496-10 AVC)"; International Organization for Standardization—Organisation Internationale De Normalisation; XX, XX, Jul. 2002, pp. I-XV, 1-197, XP001100641.

EP Office Action dated Oct. 6, 2005.

Kondo S. et al. "A New Method of Direct Mode Motion Compensation in Multiple Picture Prediction." IEICE Transations on Information and Systems, Information & Systems Society, Vo. E87-D, No. 9, Sep. 2004, pp. 2212-2220.

Netherlands Search Report dated Mar. 2, 2006.

Japanese Patent Office Action for corresponding Japanese patent application dated Sep. 11, 2007.

Jeon, Byeong-Moon. "Direct Mode in B Pictures". *Joint Video Team (JVT) of ISO/IEC MPEG & ITU-T VCEG (ISO/IEC JTC1/SC29/WG11 and ITU-T SG16 Q.6). 4th* Meeting: Klagenfurt, Austria, Jul. 22-26, 2002, [JVT-D056].

Office Action dated Oct. 4, 2010 issued by the German Paent Office for German Application No. 103 62 106.7-55 with English translation.

T. Wiegand, et al. "Long-Term Memory Motion-Compensated Prediction", IEEE Transactions in Circuits and Systems for Video Technology, vol. 9, No. 1, Feb. 1999.

Japanese Office Action dated Sep. 29, 2010 issued in corresponding Japanese application No. 2008-061152.

U.S. Office Action dated May 8, 2012 for corresponding U.S. Appl. No. 12/285,668.

U.S. Office Action dated May 15, 2012 for corresponding U.S. Appl. No. 12/285,664.

U.S. Office Action dated May 2, 2012, for corresponding U.S. Appl. No. 12/285,667.

U.S. Office Action dated May 31, 2012 for corresponding U.S. Appl. No. 12/285,626.

U.S. Office Action dated Jun. 4, 2012 for corresponding U.S. Appl. No. 12/285,665.

U.S. Office Action dated Jun. 4, 2012 for corresponding U.S. Appl. No. 12/285,552.

U.S. Office Action dated Jun. 6, 2012 for corresponding U.S. Appl. No. 12/285,553.

U.S. Office Action dated May 3, 2012 for corresponding U.S. Appl. No. 12/285,628.

U.S. Office Action dated May 31, 2012 for corresponding U.S. Appl. No. 12/285,627.

European Summons Notice dated May 4, 2012 for corresponding European Patent Application No. 09000883.0-2223/2046055.

European Summons Notice dated May 14, 2012 for corresponding European Patent Application No. 09000866.5-2223/2059054.

European Summons Notice dated May 14, 2012 for corresponding European Patent Application No. 09000885.5-2223/2046057.

European Summons Notice dated May 14, 2012 for corresponding European Patent Application No. 09000884.8-2223/2046056.

European Summons Notice dated May 14, 2012 for corresponding European Patent Application No. 09000865.7-2223/2046054.

European Summons Notice dated May 14, 2012 for corresponding European Patent Application No. 09000886.3-2223/2046058.

European Summons Notice dated May 15, 2012 for corresponding European Patent Application No. 08016892.5-2223/2009926.

European Summons Notice dated May 15, 2012 for corresponding European Patent Application No. 09000888.9-2223/2046060.

European Summons Notice dated May 15, 2012 for corresponding European Patent Application No. 08016894.1-2223/2015586.

European Summons Notice dated May 15, 2012 for corresponding European Patent Application No. 09000887.1-2223/2046059.

European Summons Notice dated May 15, 2012 for corresponding European Patent Application No. 08016889.1-2223/2009925.

Office Action for corresponding Korean Application No. 10-2008-0089780 dated Jun. 29, 2009.

Office Action for corresponding Korean Application No. 10-2009-0008017 dated Mar. 12, 2009.

Office Action for corresponding Korean Application No. 10-2008-0008015 dated Oct. 13, 2008.

Office Action for corresponding Korean Application No. 10-2008-0108251 dated Sep. 30, 2010.

Office Action for corresponding Chinese Application No. 2005100488533 dated Sep. 16, 2008.

Notice of Allowance for corresponding UK Application No. GB05143436.6 dated Apr. 11, 2006.

Office Action for corresponding Russian Application No. 2003100396/09 dated Mar. 30, 2004.

Decision on Grant of Patent for corresponding Russian Application No. 2003100396/09 dated Feb. 21, 2005.

*Newnes Guide to Digital TV*, "Video data compression", pp. 131-135, Published in 2000.

U.S. Office Action dated Apr. 9, 2012 for corresponding U.S. Appl. No. 11/907,075.

U.S. Office Action dated Apr. 11, 2012 for corresponding U.S. Appl. No. 11/907,076.

U.S. Office Action dated Apr. 24, 2012 for corresponding U.S. Appl. No. 11/907,078.

U.S. Office Action dated Apr. 25, 2012 for corresponding U.S. Appl. No. 12/285,546.

U.S. Office Action dated May 2, 2012 for corresponding U.S. Appl. No. 12/285,624.

* cited by examiner

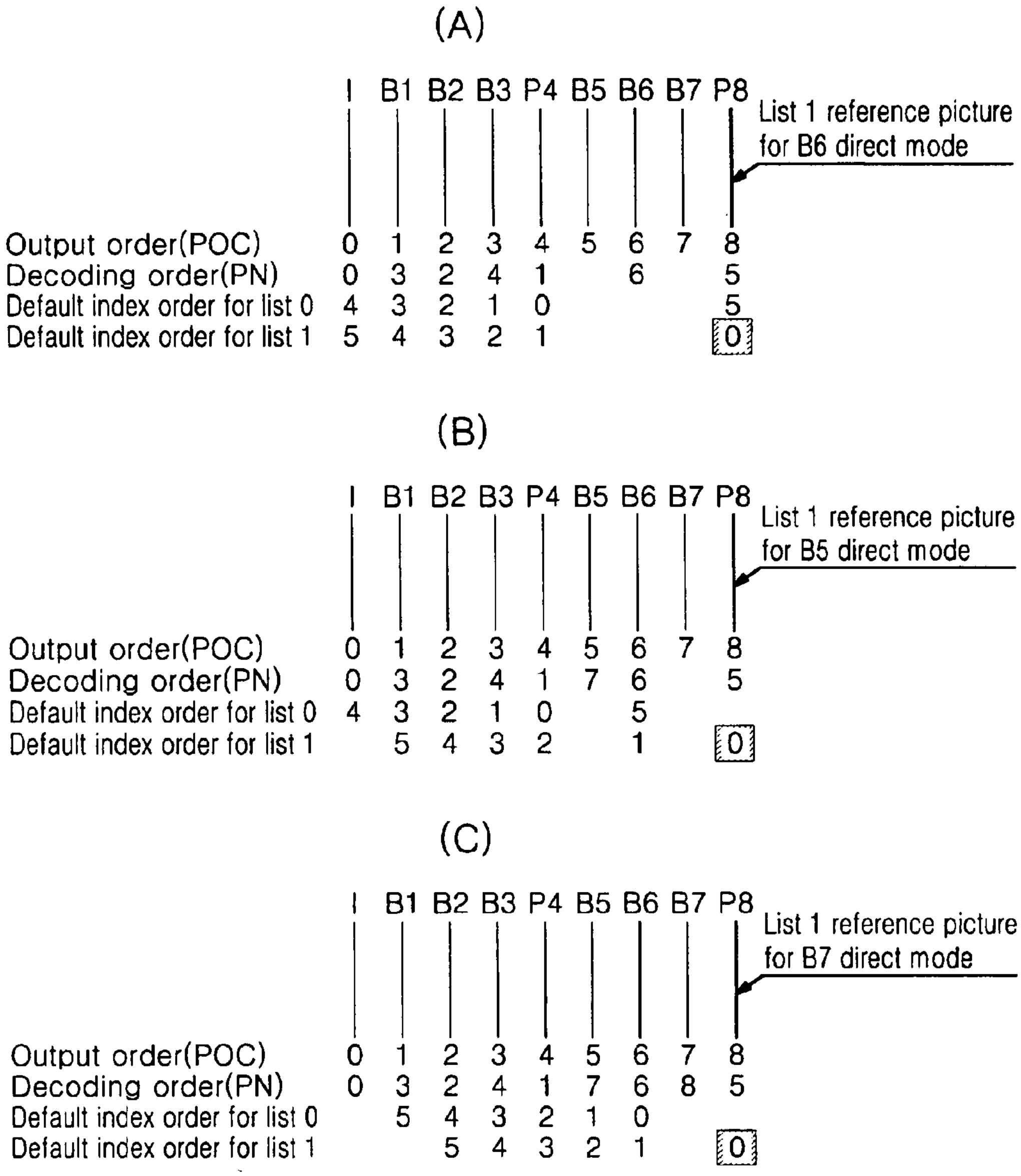

```
                              I  B1 B2 B3 P4 B5 B6 B7 P8
                              |  |  |  |  |  |  |  |  |   List 1 reference picture
                              |  |  |  |  |  |  |  |  |   for B6 direct mode
Output order(POC)             0  1  2  3  4  5  6  7  8
Decoding order(PN)            0  3  2  4  1     6     5
Default index order for list 0 4  3  2  1  0           5
Default index order for list 1 5  4  3  2  1          [0]
```

(B)

```
                              I  B1 B2 B3 P4 B5 B6 B7 P8
                              |  |  |  |  |  |  |  |  |   List 1 reference picture
                              |  |  |  |  |  |  |  |  |   for B5 direct mode
Output order(POC)             0  1  2  3  4  5  6  7  8
Decoding order(PN)            0  3  2  4  1  7  6     5
Default index order for list 0 4  3  2  1  0     5
Default index order for list 1    5  4  3  2     1    [0]
```

(C)

```
                              I  B1 B2 B3 P4 B5 B6 B7 P8
                              |  |  |  |  |  |  |  |  |   List 1 reference picture
                              |  |  |  |  |  |  |  |  |   for B7 direct mode
Output order(POC)             0  1  2  3  4  5  6  7  8
Decoding order(PN)            0  3  2  4  1  7  6  8  5
Default index order for list 0    5  4  3  2  1  0
Default index order for list 1       5  4  3  2  1    [0]
```

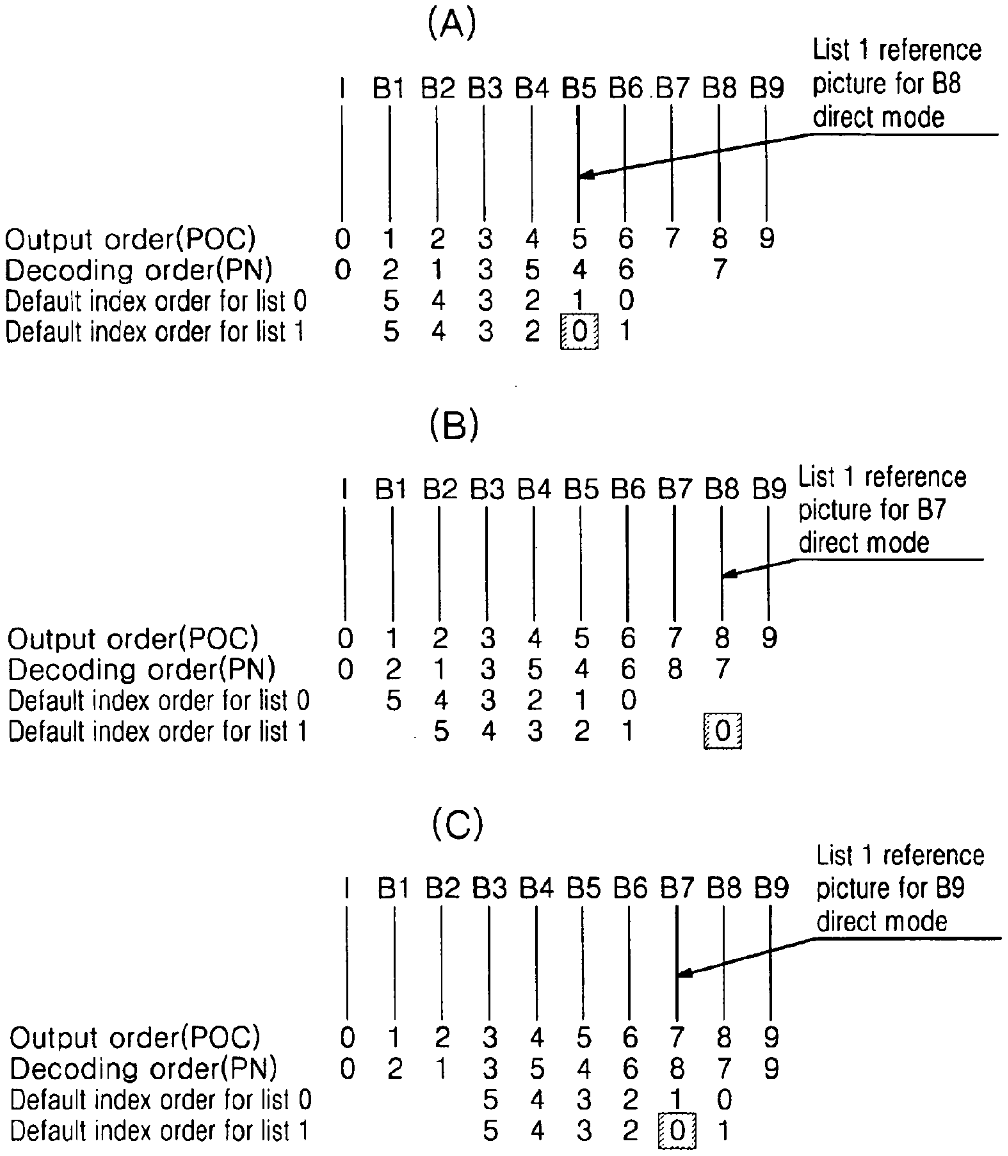

```
                          I  B1 B2 B3 B4 B5 B6 B7 B8 B9    List 1 reference
                          |  |  |  |  |  |  |  |  |  |     picture for B8
                          |  |  |  |  |  |  |  |  |  |     direct mode
                          |  |  |  |  |  ↑  |  |  |  |  ←
Output order(POC)         0  1  2  3  4  5  6  7  8  9
Decoding order(PN)        0  2  1  3  5  4  6     7
Default index order for list 0    5  4  3  2  1  0
Default index order for list 1    5  4  3  2 [0] 1
```

(B)

```
                          I  B1 B2 B3 B4 B5 B6 B7 B8 B9    List 1 reference
                          |  |  |  |  |  |  |  |  |  |     picture for B7
                          |  |  |  |  |  |  |  ↑  |  |     direct mode
                          |  |  |  |  |  |  |  |  |  |  ←
Output order(POC)         0  1  2  3  4  5  6  7  8  9
Decoding order(PN)        0  2  1  3  5  4  6  8  7
Default index order for list 0    5  4  3  2  1  0
Default index order for list 1       5  4  3  2  1 [0]
```

(C)

```
                          I  B1 B2 B3 B4 B5 B6 B7 B8 B9    List 1 reference
                          |  |  |  |  |  |  |  |  |  |     picture for B9
                          |  |  |  |  |  |  |  ↑  |  |     direct mode
                          |  |  |  |  |  |  |  |  |  |  ←
Output order(POC)         0  1  2  3  4  5  6  7  8  9
Decoding order(PN)        0  2  1  3  5  4  6  8  7  9
Default index order for list 0          5  4  3  2  1  0
Default index order for list 1          5  4  3  2 [0] 1
```

FIG. 12
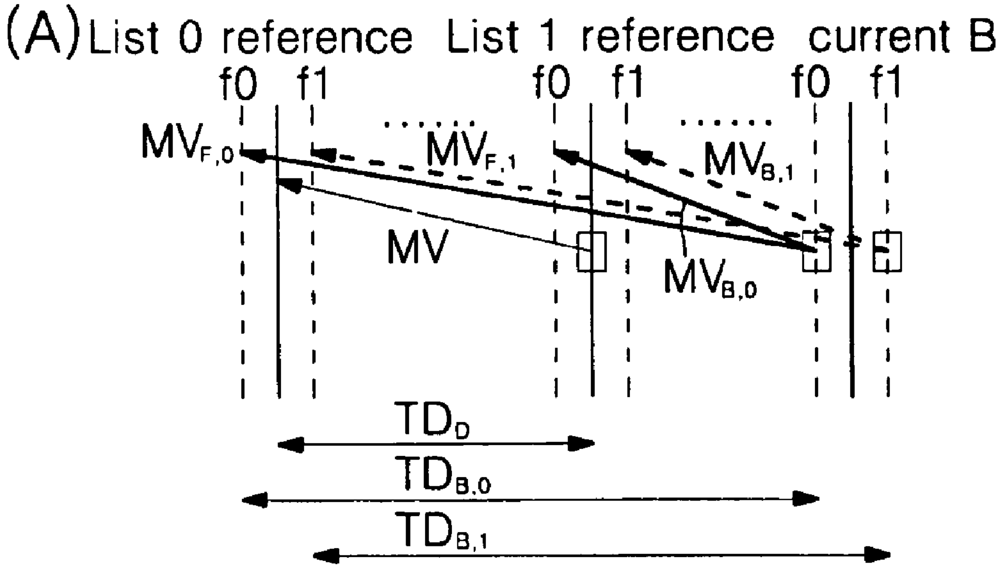
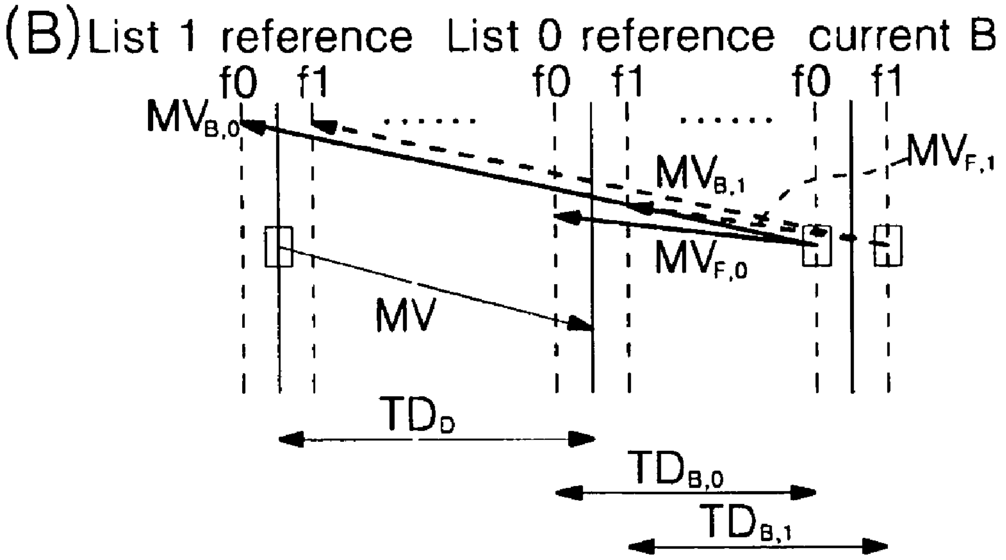

FIG. 13
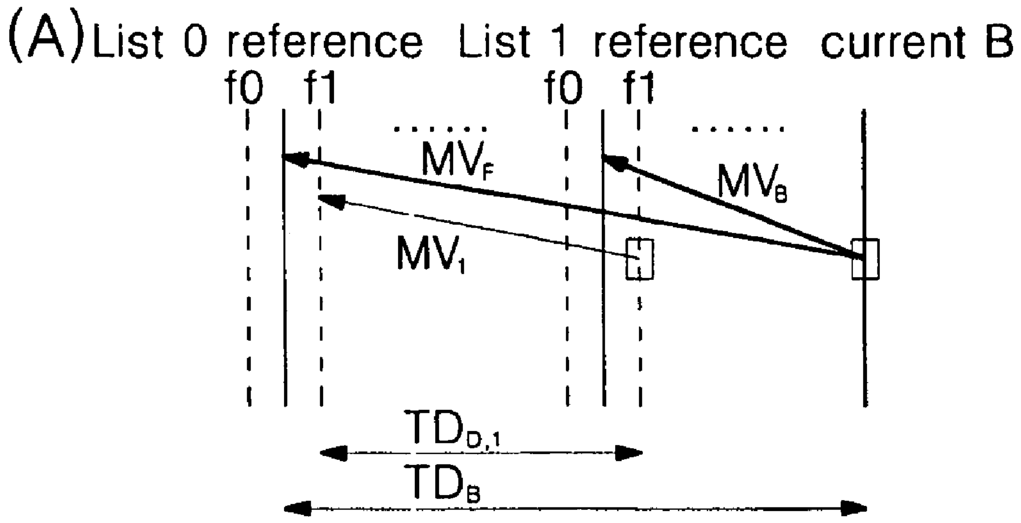
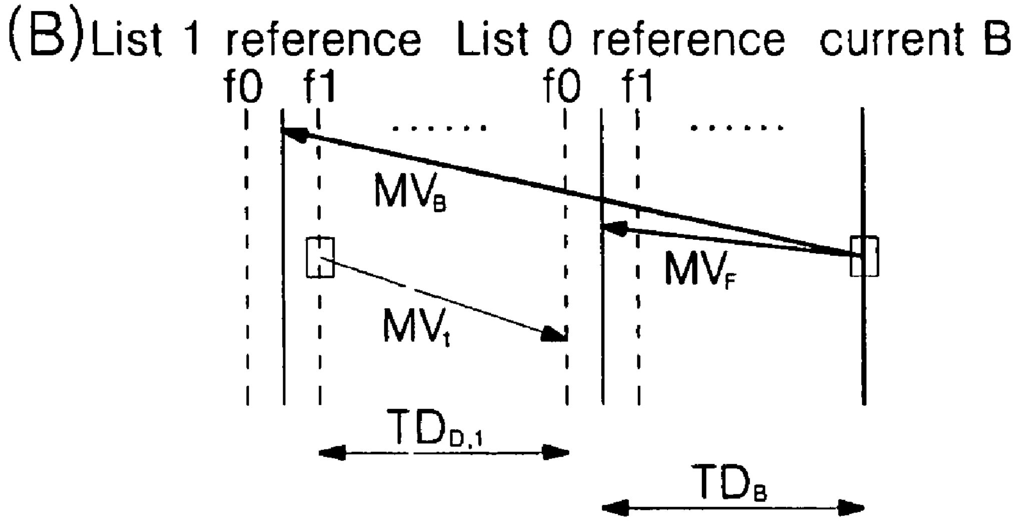

METHOD OF DERIVING A MOTION VECTOR OF A BI-PREDICTIVE BLOCK BASED ON A MOTION VECTOR OF A CO-LOCATED BLOCK IN A REFERENCE PICTURE

FOREIGN PRIORITY INFORMATION

The present invention claims priority under 35 U.S.C. 119 on Korean Application No. 10-2002-0060742 filed Oct. 4, 2002, Korean Application No. 10-2002-0061243 filed Oct. 8, 2002 and Korea Application No. 10-2002-0071226, filed Nov. 15, 2002; the contents of which are hereby incorporated by reference in their entirety.

DOMESTIC PRIORITY INFORMATION

This is a divisional of U.S. application Ser. No. 11/044,002 filed Jan. 28, 2005 now U.S. Pat. No. 7,606,307, which is a divisional of U.S. application Ser. No. 10/338,283 filed Jan. 6, 2003 and issued as U.S. Pat. No. 7,233,621; the contents of all of which are hereby incorporated by reference in their entirety.

BACKGROUND OF THE INVENTION

1. Field of the Invention

The present invention relates to a moving picture coding method, and more particularly to a technique for deriving motion vectors of a B (bi-predictive) picture.

2. Description of the Related Art

A conventional B picture has five types of predictive modes such as forward mode, backward mode, bi-directional mode, direct mode and intra mode. In the forward mode, backward mode and bi-directional mode, the directions of motion vectors can be recognized from mode names because direction information are involved in the mode names. In the direct mode, two motion vectors of both directions are derived from a motion vector of a co-located block in a neighboring picture on the basis of a temporal redundancy characteristic that motion continuity is constantly maintained between two adjacent pictures. This direct mode has an advantage in terms of coding efficiency because motion information is not sent to a decoder.

On the other hand, a B picture proposed in a next-generation moving picture compression technique such as H.264 or MPEG-4 part 10 is characterized in that the B picture is allowed to be used as a reference picture because it can be stored in a reference picture buffer. This B picture is further characterized in that it has five types of predictive modes such as list 0 mode, list 1 mode, bi-predictive mode, direct mode and intra mode.

The list 0 mode is similar to the conventional forward mode, and motion information such as a reference picture index and motion vector difference are indicated respectively by ref_idx_10 and mvd_10. The list 1 mode is also similar to the conventional backward mode, and motion information such as a reference picture index and motion vector difference are indicated respectively by ref_idx_11 and mvd_11. The bi-predictive mode has two reference pictures, both of which may be located temporally before or after the B picture, or which may be located temporally before and after the B picture, respectively. In this case, two reference picture indexes and two motion vector differences are indicated respectively by ref_idx_10, ref_idx_11, mvd_10, and mvd_11, and each reference pictures has picture order count (POC) data which is temporal location information.

In the direct mode, motion vectors are obtained by selecting any one of a spatial technique and temporal technique. The spatial direct mode technique is to derive list 0 and list 1 reference picture indexes and motion vectors from neighboring blocks of a macroblock to be coded. The temporal direct mode technique is to derive a list 0 motion vector $MV_F$ and list 1 motion vector $MV_B$ by scaling the only motion vector, a list 0 motion vector, of a co-located block in a list 1 reference picture for direct mode, which is similar to the conventional B picture. Here, the list 1 reference picture for direct mode is a P picture (hence the singe motion vector) where an index for list 1 prediction is 0, and a list 0 reference picture for direct mode is a list 0 reference picture pointed by a motion vector of a co-located block in the list 1 reference picture for direct mode.

FIGS. 1(A) to 1(C) show default indexes for list 0 prediction, default indexes for list 1 prediction and list 1 reference pictures for direct mode of respective B pictures in an IBBBP pattern when the number of available list 0 and list 1 reference pictures (or the size of a short-term buffer) is 6, respectively. Here, the default indexes for list 0 prediction and the default indexes for list 1 prediction are dependant on an output order, or POC value, of a previously decoded reference picture regardless of a decoding order. In FIG. 1, all the B pictures use a temporally following P picture as the list 1 reference picture for direct mode.

FIGS. 2(A) to 2(C) show default indexes for list 0 prediction, default indexes for list 1 prediction and list 1 reference pictures for direct mode of respective B pictures in an IBBB pattern using only the B pictures, respectively. In FIG. 2(A), when a B picture to be coded is B8, a temporally preceding B5 with a list 1 index 0 is a list 1 reference picture for direct mode. As shown FIG. 2(B), a list 1 reference picture for direct mode of B7 to be subsequently decoded is the temporally following B8. Last, as shown in FIG. 2(C), a list 1 reference picture for direct mode of B9 to be subsequently decoded is the temporally preceding B7.

In conclusion, as seen from FIGS. 1(A) to 2(C), a list 1 reference picture for direct mode may be a P or B picture temporally following a B picture to be coded, or a B picture temporally preceding it.

FIGS. 3(A) to 3(H) show modes that a co-located block in a list 1 reference picture for direct mode can have when the list 1 reference picture temporally follows a B picture. In this case, because the list 1 reference picture can be a P picture or B picture, the co-located block thereof has one or two motion vectors, or the intra mode. The next-generation moving picture compression technique, such as H.264 or MPEG-4 part 10, permits the reordering of reference picture indexes at a slice level, so an index 0 for list 1 prediction can be assigned to a picture just after a B picture. That is, since the list 1 reference picture can exist just after a B picture, a motion vector of the co-located block can be directed forward or backward.

FIGS. 4(A) to 4(H) show modes that a co-located block in a list 1 reference picture for direct mode can have when the list 1 reference picture temporally precedes a B picture. In this case, the co-located block has one or two motion vectors, or the intra mode, as described above. Other reference pictures can be present between the list 1 reference picture and the B picture, so a motion vector of the co-located block can point to temporally forward or backward direction.

As seen from FIGS. 3(A) to 4(H), the list 1 reference picture for direct mode can have various predictive modes, resulting in a need to explore a method for calculating direct mode motion vectors in consideration of such various cases.

SUMMARY OF THE INVENTION

The present invention relates to a method of deriving a motion vector of a bi-predictive block based on a motion vector of a co-located block in a reference picture.

In one embodiment, the method includes selecting a list 0 motion vector of the co-located block in a first reference picture if the co-located block has the list 0 motion vector and a list 1 motion vector. The first reference picture is a type of reference picture permitted to be located temporally before or after the current picture, and the selected list 0 motion vector points to a second reference picture which is a reference picture of the first reference picture. The method further includes deriving the list 0 and list 1 motion vectors of the bi-predictive block based on the selected list 0 motion vector of the co-located block. The deriving includes deriving a first temporal distance from a difference between the current picture and the first reference picture, deriving a second temporal distance from a difference between the first reference picture and the second reference picture, and scaling the selected list 0 motion vector of the co-located block based on the first and second temporal distances.

BRIEF DESCRIPTION OF THE DRAWINGS

The above and other objects, features and other advantages of the present invention will be more clearly understood from the following detailed description taken in conjunction with the accompanying drawings, in which:

FIGS. 1(A) to 1(C) are views frustrating list 1 reference pictures for direct mode in a general IBBBP pattern;

FIGS. 2(A) to 2(C) are views illustrating list 1 reference pictures for direct mode in a general IBBB pattern;

FIGS. 12(A) and 12(B) are views illustrating cases where a macroblock of a B picture is in a field mode, a co-located macroblock in a list 1 reference picture for a general direct mode is in a frame mode, and the list 1 reference picture temporally precedes the B picture; and FIGS. 13(A) and 13(B) are views illustrating cases where a macroblock of a B picture is in a frame mode, a co-located macroblock in a list 1 reference picture for a general direct mode is in a field mode, and the list 1 reference picture temporally precedes the B picture.

DESCRIPTION OF THE EMBODIMENTS

The present invention proposes a method for deriving direct mode motion vectors when a co-located macroblock in a list 1 reference picture for direct mode is in an intra mode, and a method for acquiring the direct mode motion vectors in a case where the list 1 reference picture temporally follows a B picture and in a case where the list 1 reference picture temporally precedes the B picture.

The present invention further proposes a method for calculating the direct mode motion vectors regardless of the locations of list 0 and list 1 reference pictures for direct mode by assigning a sign to an inter-picture temporal distance value to simplify algorithms used for calculation of the direct mode motion vectors.

On the other hand, a frame mode and a field mode are switched at a picture level, so the B picture and list 1 reference picture can be coded into frame mode or field mode. As a result a macroblock of the B picture and a co-located macroblock of the list 1 reference picture have four types of frame/field-coded combinations.

Figure 3:
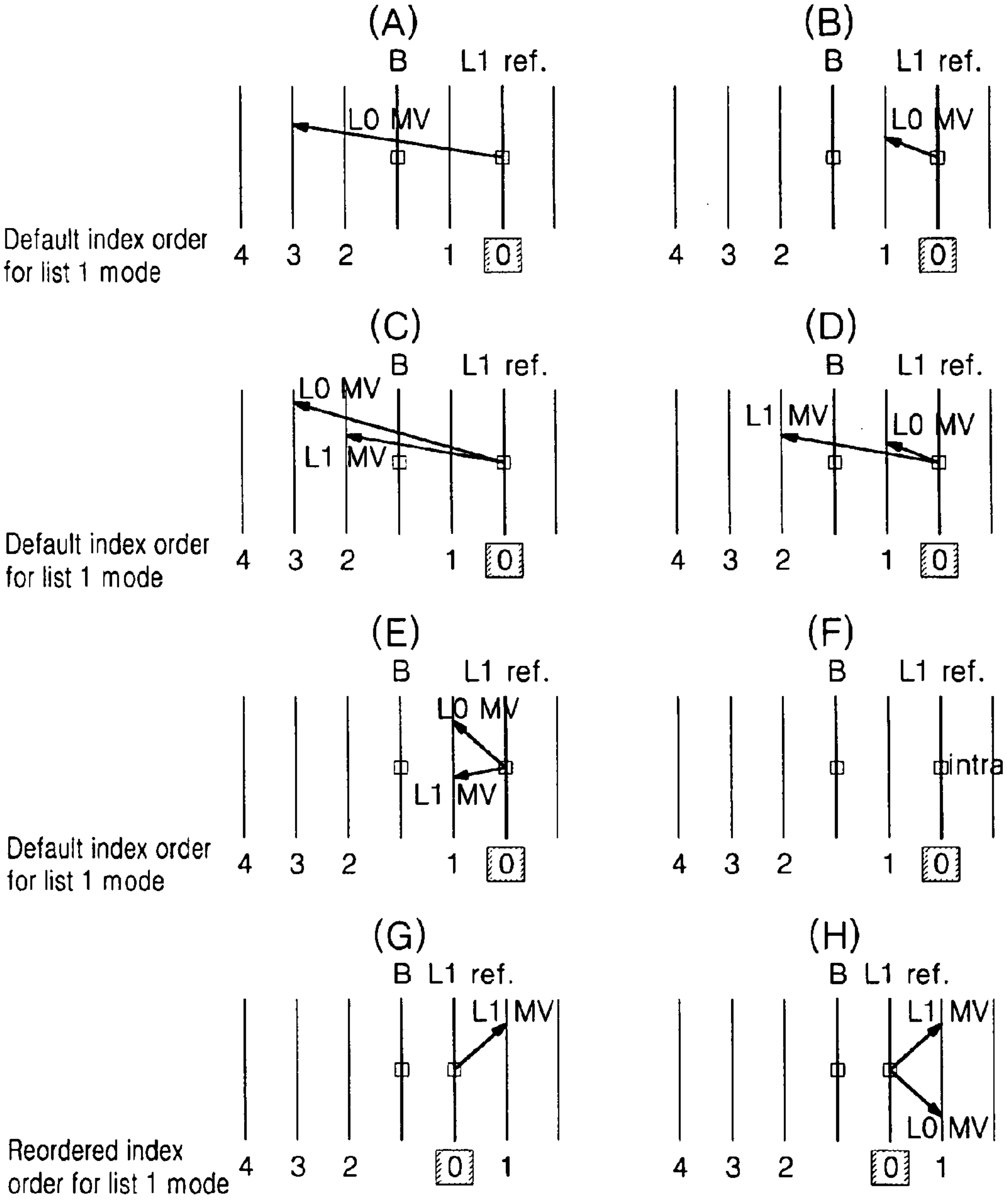
FIGS. 3(A) to 3(H) are views illustrating cases where a list 1 reference picture for direct mode temporally follows a B picture (LO MV: list 0 motion vector and L1 MV: list 1 motion vector)
Figure 4:
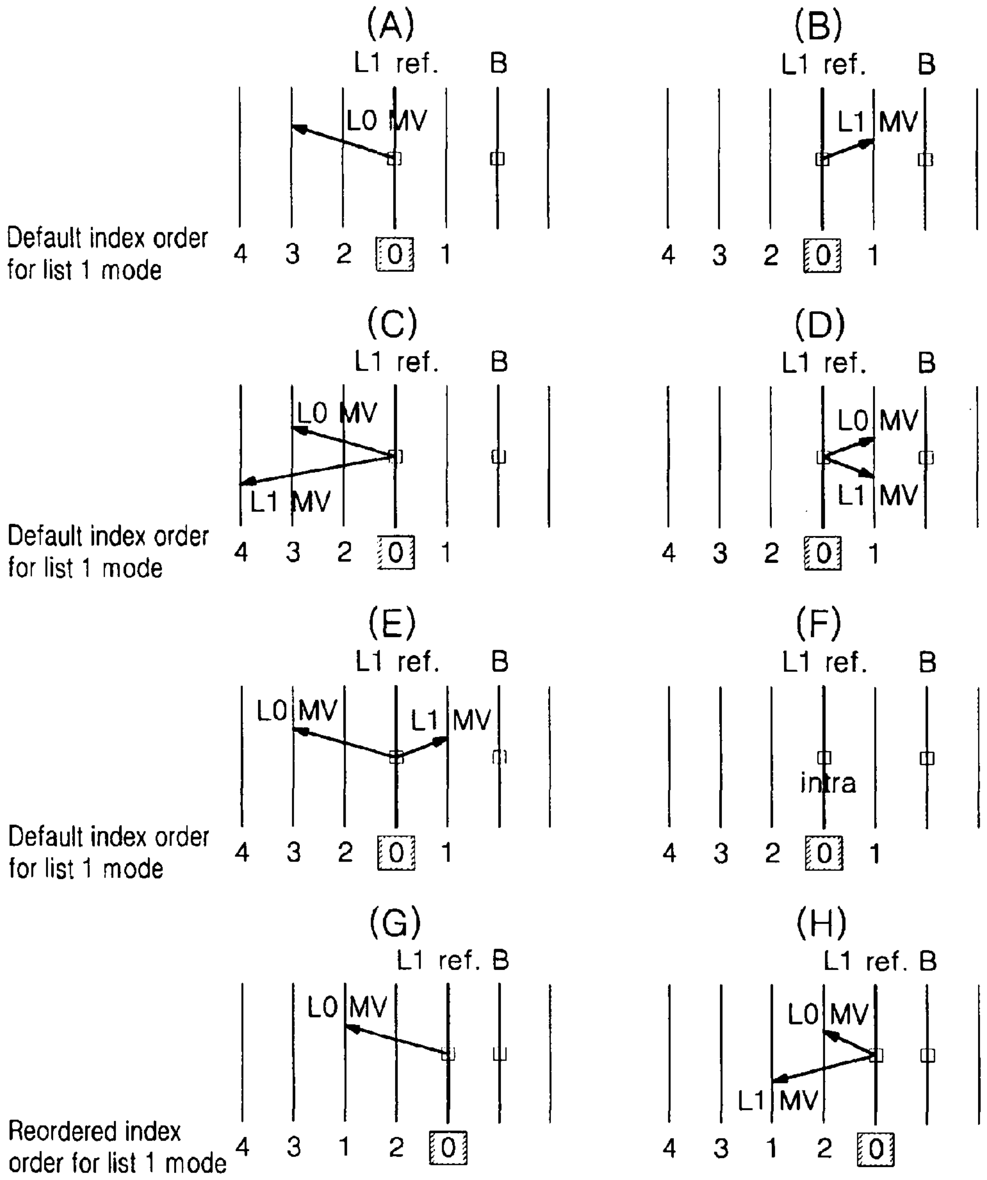
FIGS. 4(A) to 4(H) are views illustrating cases where a list 1 reference picture for direct mode temporally precedes a B picture (LO MV: list 0 motion vector and L1 MV: list 1 motion vector)

[1] Case where Co-Located Macroblock of List 1 Reference Picture is in Intra Mode As shown in FIGS. 3(F) and 4(F), a co-located macroblock in a list 1 reference picture for direct mode can be in the intra mode regardless of a temporal location of the reference picture. Because the macroblock in this mode has no motion information, a conventional method simply sets direct mode motion vectors to 0 and defines a list 0 reference picture to be the latest decoded picture. However, the conventional method cannot guarantee a high coding efficiency. Therefore, the present invention predicts and calculates list 0 and list 1 reference pictures and motion vectors from neighboring blocks of a macroblock of a B picture to be coded, on the basis of a spatial redundancy.

Figure 5:
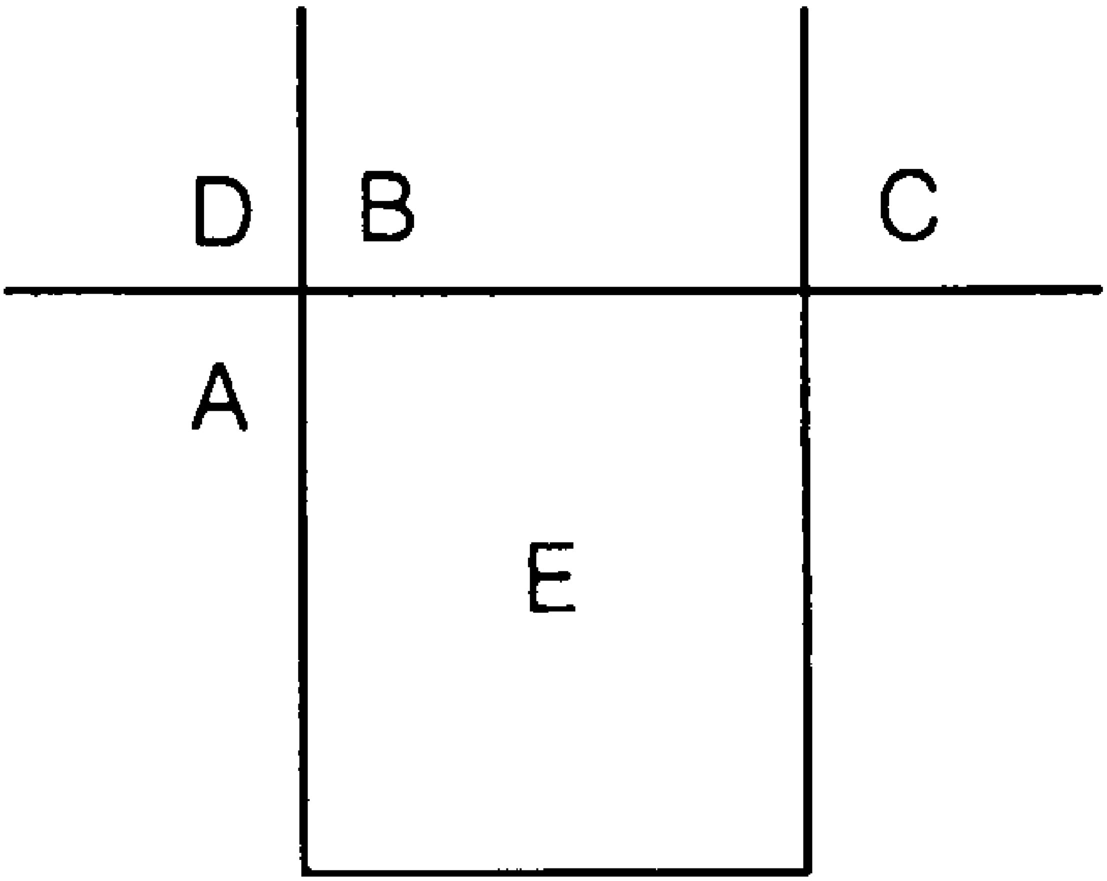
FIG. 5 is a view illustrating the motion vector prediction of a block E using motion vectors of neighboring blocks A, B and C in consideration of a general spatial redundancy.

A reference picture index for each list mode is acquired in the following manner. FIG. 5 is a view illustrating the motion vector prediction of a block E using motion vectors of neighboring blocks A, B and C in consideration of a general spatial redundancy.

if the neighboring blocks A, B and C have different reference picture indexes, a smallest one of the reference picture indexes is determined to be a reference picture index for the direct mode.

if two ones of the neighboring blocks have the same reference picture index, this index is determined to be a reference picture index for the dirt mode.

if all the neighboring blocks have the same reference picture index, this index is determined to be a reference picture index for the direct mode.

Also, a motion vector for each list mode is acquired through the following motion vector prediction. At this time, if any one of the neighboring blocks A, B and C is in the intra mode, its list 0 and list 1 motion vectors are set to 0.

a motion vector having the same direction as that of a temporal location of the above-acquired reference picture for each list mode is selected from a neighboring block and a motion vector for each list mode is acquired through a median operation.

if a neighboring block has two motion vectors with the same directions, only one of the two motion vectors is selected in that block and included in the median operation.

On the other hand, if neither of the effective list 0 and list 1 reference picture indexes can be derived from a neighboring block, they are set to 0 and a motion vector for each list mode is set to 0.

[2] Cases where List 1 Reference Picture for Direct Mode Temporally Follows B Picture Case 1: Both Macroblock of B Picture and Co-Located Macroblock of List 1 Reference Picture are in Frame Mode As seen from FIGS. 3(A) to 3(H), the co-located block in the list 1 reference picture can have one motion vector or two motion vectors. In the present invention, if the co-located block has two motion vectors, one (L0 MV or L1 MV) of the two motion vectors is selected and direct mode motion vectors are derived from the selected motion vector (this will hereinafter be described on the basis of the case where L0 MV (list 0 motion vector) is selected).

Figure 6:
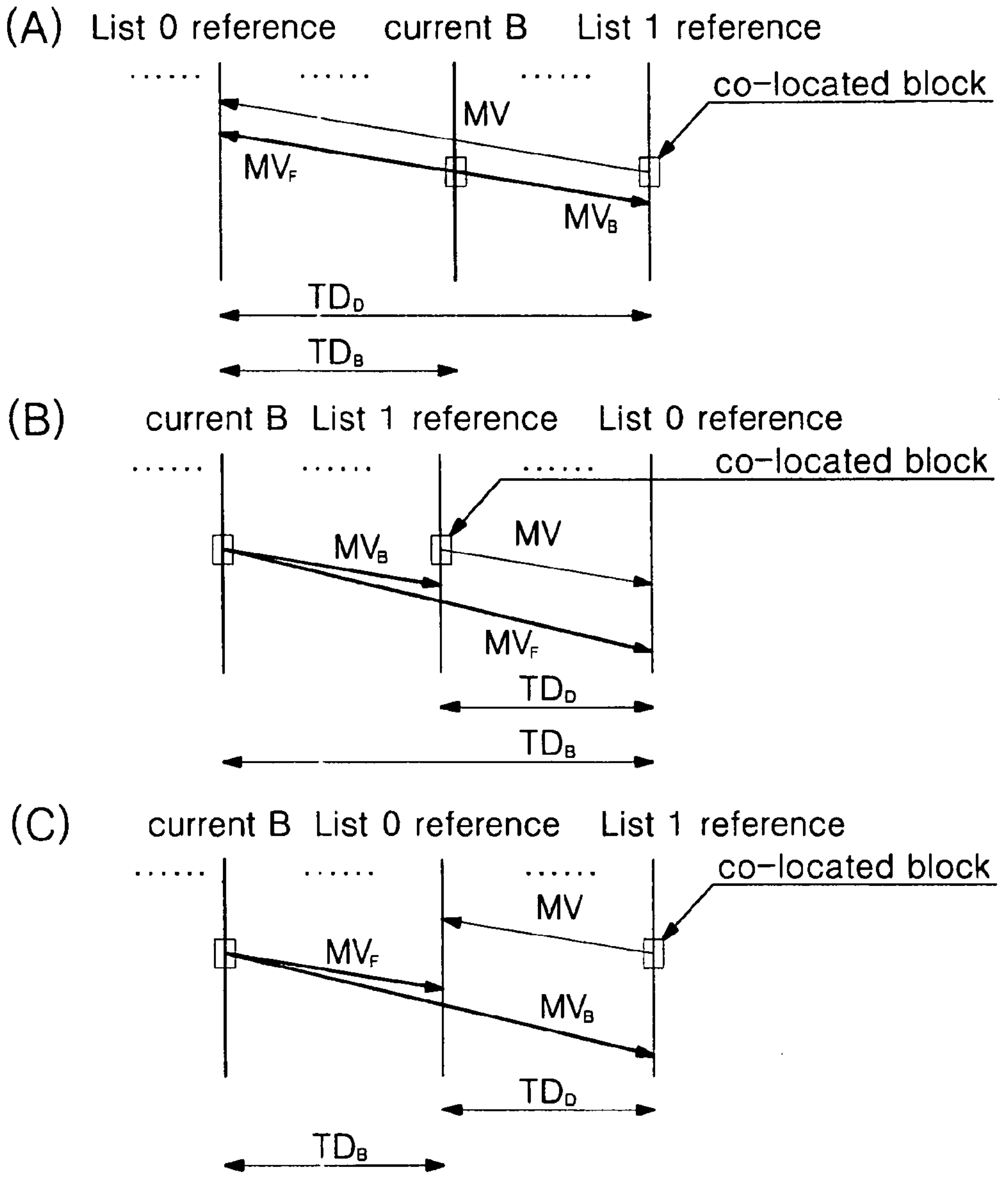
FIGS. 6(A) to 6(C) are views illustrating cases where both a macroblock of a B picture and a co-located macroblock in a list 1 reference picture for direct mode are in a frame mode and the list 1 reference picture temporally follows the B picture.

Accordingly, FIGS. 3(A) and 3(C) can be simply depicted as FIG. 6(A), FIGS. 3(B), 3(D) and 3(E) as FIG. 6(C), and FIGS. 3(G) and 3(H) as FIG. 6(B), respectively.

If the list 0 reference picture and list 1 reference picture for direct mode are located temporally before and after the B picture, respectively (FIG. 6(A)), or if both the list 0 and list 1 reference pictures for the direct mode are located temporally after the B picture and the list 0 reference picture temporally follows the list 1 reference picture (FIG. 6(B)), direct mode motion vectors $MV_F$ and $MV_B$ are calculated as follows:

$$MV_F = TD_B \times MV / TD_D$$

$$MV_B = (TD_B - TD_D) \times MV / TD_D$$

where, $TD_B$ represents a temporal distance between a current B frame and a list 0 reference frame, and $TD_D$ represents a temporal distance between a list 1 reference frame and the list 0 reference frame.

Applying a bit operation to the calculation of the direct mode motion vectors $MV_F$ and $MV_B$ for the convenience thereof, the above equation may be expressed as follows:

$$Z = TD_B \times 256 / TD_D \quad MV_F = (Z \times MV + 128) >> 8$$

$$W = Z - 256 \quad MV_B = (W \times MV + 128) >> 8$$

If both the list 0 and list 1 reference pictures for the direct mode are located temporal after the B picture and the list 0 reference picture temporally precedes the list 1 reference picture (FIG. 6(C)), the direct mode motion vectors $MV_F$ and $MV_B$ are calculated as follows:

$$MV_F = -TD_B \times MV / TD_D$$

$$MV_B = -(TD_B + TD_D) \times MV / TD_D$$

This equation may be expressed as follows:

$$Z = -TD_B \times 256 / TD_D \quad MV_F = (Z \times MV + 128) >> 8$$

$$W = Z - 256 \quad MV_B = (W \times MV + 128) >> 8$$

Case 2: Both Macroblock of B Picture and Co-Located Macroblock of List 1 Reference Picture are in Field Mode FIGS. 7(A) to 7(D) show cases where both the macroblock of the B picture and the co-located macroblock of the list 1 reference picture are in the field mode. Each motion vector of the macroblock of the B picture is derived from a motion vector of a co-located block in a list 1 reference field of the same parity.

Figure 7:
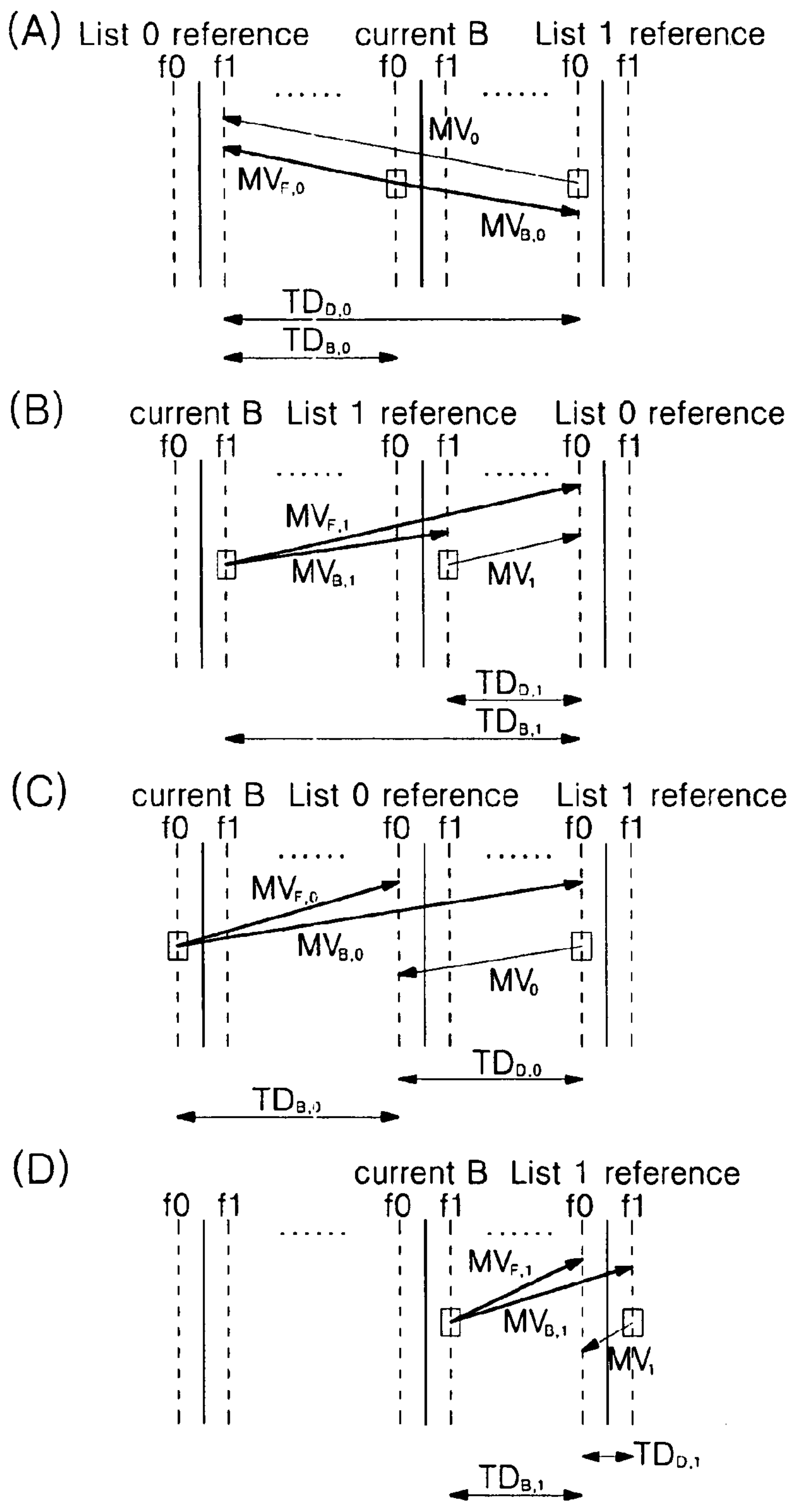
FIGS. 7(A) to 7(D) are views illustrating cases where both a macroblock of a B picture and a co-located macroblock in a list 1 reference picture for direct mode are in a field mode and the list 1 reference picture temporally follows the B picture.

If the list 0 and list 1 reference pictures for the direct mode are located temporally before and after the B picture, respectively (FIG. 7(A)), or if both the list 0 and list 1 reference pictures for the direct mode are located temporally after the B picture and the list 0 reference picture temporally follows the list 1 reference picture (FIG. 7(B)), direct mode list 0 and list 1 motion vectors $MV_{F,i}$ and $MV_{B,i}$ for each field i of a B frame (i=0 signifies a first field and i=1 signifies a second field) are calculated as follows:

$$MV_{F,i} = TD_{B,i} \times MV_i / TD_{D,i}$$

$$MV_{B,i} = (TD_{B,i} - TD_{D,i}) \times MV_i / TD_{D,i}$$

where, $MV_i$ represents a motion vector of a co-located block of a field i in a list 1 reference frame, $TD_{B,i}$ represents a temporal distance between a current B field and a list 0 reference field, and $TD_{D,i}$ represents a temporal distance between a list 1 reference field and the list 0 reference field.

The above equation may be expressed as follows:

$$Z = TD_{B,i} \times 256 / TD_{D,i} \quad MV_{F,i} = (Z \times MV_i + 128) >> 8$$

$$W = Z - 256 \quad MV_{B,i} = (W \times MV_i + 128) >> 8$$

If, because the co-located block of the field i in the list 1 reference frame has a motion vector pointing to a field in a frame temporally following the B picture, both the list 0 and list 1 reference pictures for the direct mode are located temporally after the B picture and the list 0 reference picture temporally precedes the list 1 reference picture (FIGS. 7(C) and 7(D)), the direct mode list 0 and list 1 motion vectors $MV_{F,i}$ and $MV_{B,i}$ are calculated as follows:

$$MV_{F,i} = -TD_{B,i} \times MV_i / TD_{D,i}$$

$$MV_{B,i} = -(TD_{B,i} + TD_{D,i}) \times MV_i / TD_{D,i}$$

The above equation may be expressed as follows:

$$Z = -TD_{B,i} \times 256 / TD_{D,i} \quad MV_{F,i} = (Z \times MV_i + 128) >> 8$$

$$W = Z - 256 \quad MV_{B,i} = (W \times MV_i + 128) >> 8$$

Figure 8:
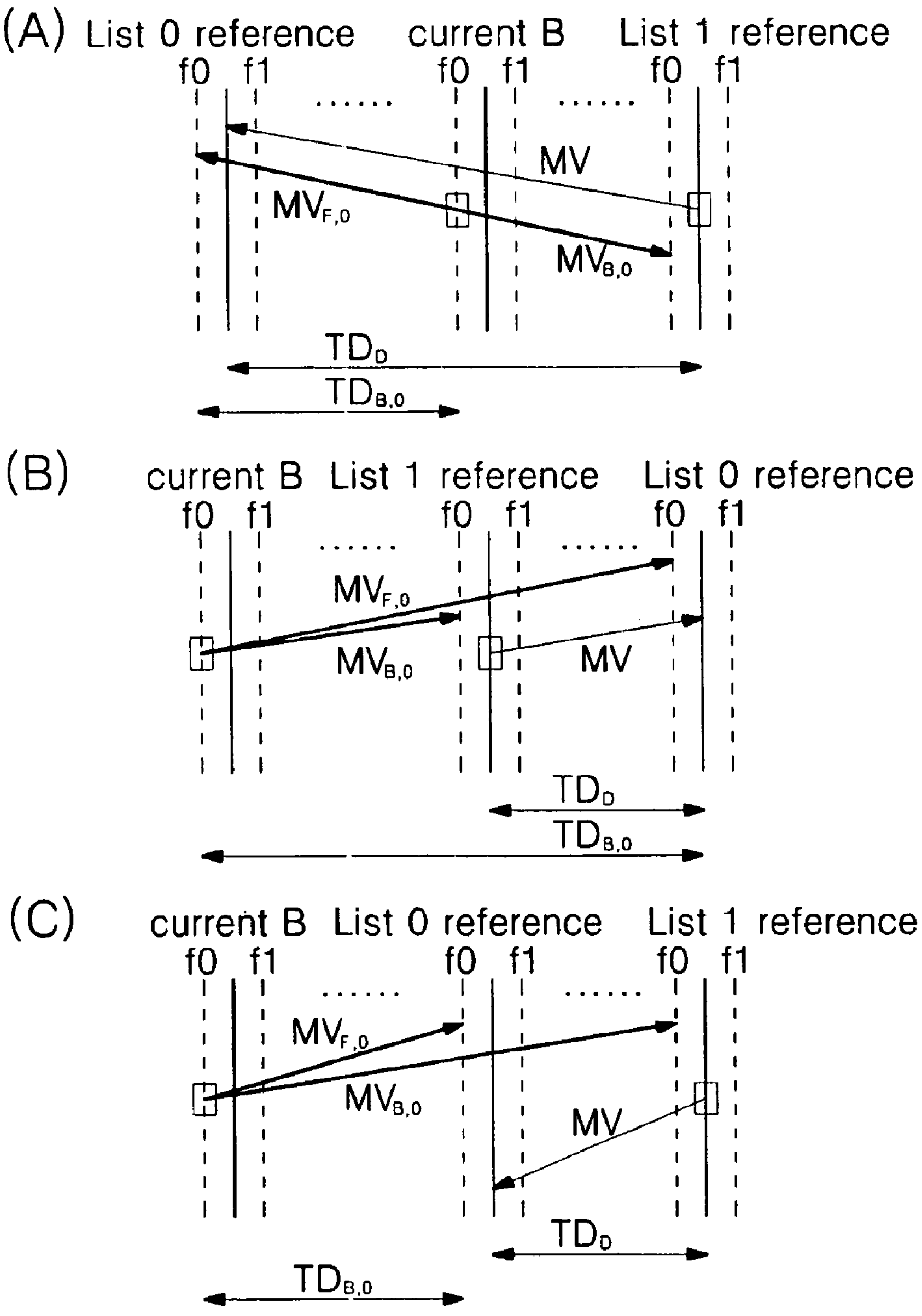
FIGS. 8(A) to 8(C) are views illustrating cases where a macroblock of a B picture is in a field mode, a co-located macroblock in a list 1 reference picture for direct mode is in a frame mode, and the list 1 reference picture temporally follows the B picture.

Case 3: Macroblock of B Picture is in Field Mode and Co-Located Macroblock of List 1 Reference Picture is in Frame Mode FIGS. 8(A) to 8(C) show cases where the macroblock of the B picture is in the field mode and the co-located macroblock of the list 1 reference picture is in the frame mode. Here, letting the vertical coordinate of the current macroblock be $y_{current}$ and the vertical coordinate of the co-located macroblock of the list 1 reference picture be $y_{co\text{-}located}$, the relation of $y_{co\text{-}located} = 2 \times y_{current}$ is established between the two coordinates. Also, list 0 and list 1 reference fields are present in the same parities of the list 0 and list 1 reference frames, respectively.

If the list 0 and list 1 reference pictures for the direct mode are located temporally before and after the B picture, respectively FIG. 8(A)), or if both the list 0 and list 1 reference pictures for the direct mode are located temporally after the B picture and the list 0 reference picture temporally follows the list 1 reference picture (FIG. 8(B)), the direct mode list 0 and list 1 motion vectors $MV_{F,i}$ and $MV_{B,i}$ for each field i of the B frame are calculated as follows:

$$MV_{F,i}=TD_{B,i}\times MV/TD_D$$

$$MV_{B,i}=(TD_{B,i}-TD_D)\times MV/TD_D$$

The above equation may be expressed as follows:

$$Z=-TD_{B,i}\times 256/TD_D \quad MV_{F,i}=(Z\times MV+128)>>8$$

$$W=Z-256 \quad MV_{B,i}=(W\times MV+128)>>8$$

If, because the co-located block in the list 1 reference frame has a motion vector pointing to a frame temporally following the B picture, both the list 0 and list 1 reference pictures for the direct mode are located temporally after the B picture and the list 0 reference picture temporally precedes the list 1 reference picture (FIG. 8(C)), the direct mode list 0 and list 1 motion vectors $MV_{F,i}$ and $MV_{B,i}$ for each field i of the B frame are calculated as follows:

$$MV_{F,i}=-TD_{B,i}\times MV/TD_D$$

$$MV_{B,i}=(TD_{B,i}+TD_D)\times MV/TD_D$$

The above equation may be expressed as follows:

$$Z=-TD_{B,i}\times 256/TD_D \quad MV_{F,i}=(Z\times MV+128)>>8$$

$$W=Z-256 \quad MV_{B,i}=(W\times MV+128)>>8$$

where, $TD_{B,i}$ represents a temporal distance between the current B field and the list 0 reference field, $TD_D$ represents a temporal distance between the list 1 reference frame and the list 0 reference frame, and MV represents a motion vector of the co-located block in the list 1 reference frame for direct mode.

Figure 9:
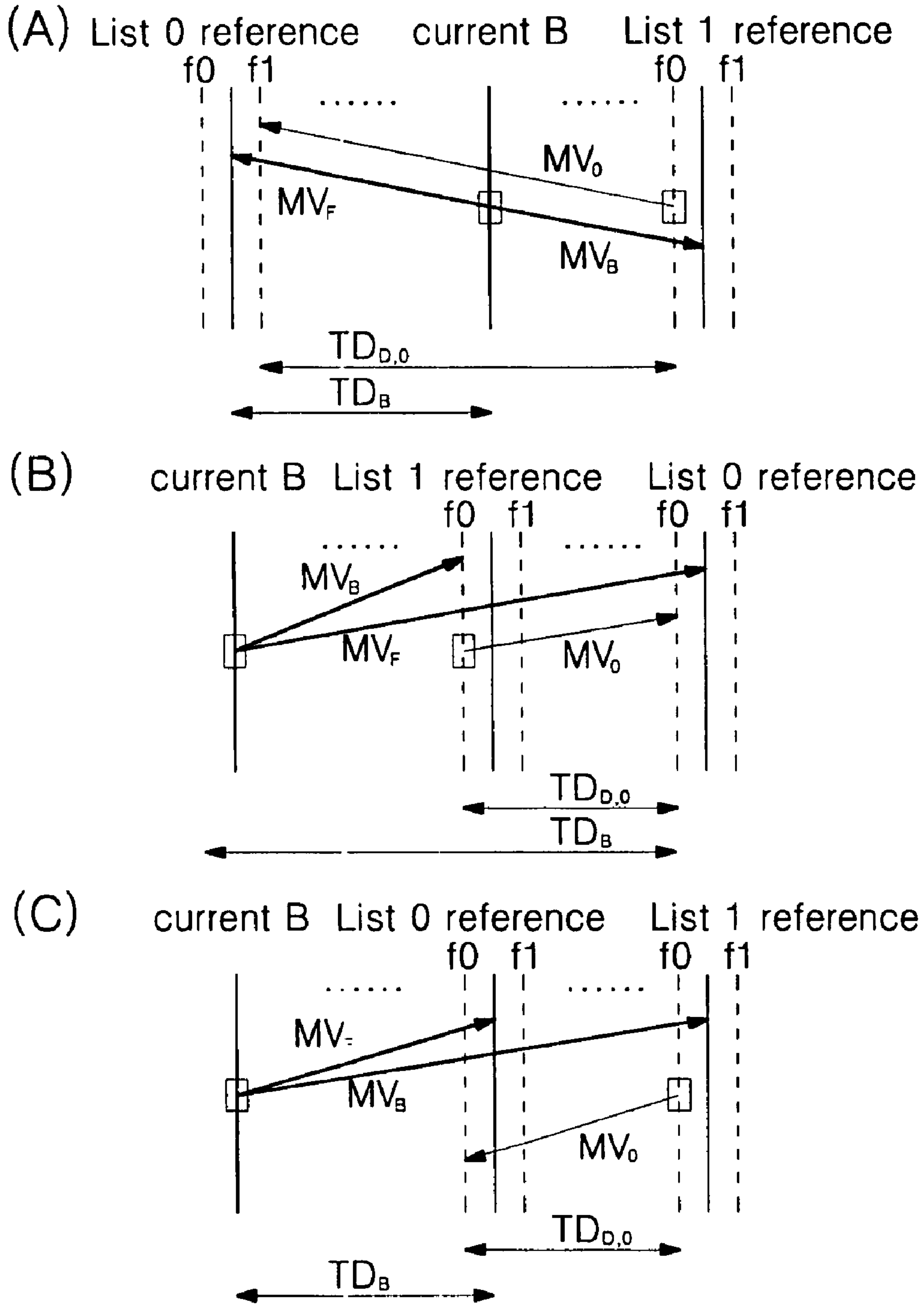
FIGS. 9(A) to 9(C) are views illustrating cases where a macroblock of a B picture is in a frame mode, a co-located macroblock in a list 1 reference picture for direct mode is in a field mode, and the list 1 reference picture temporally follows the B picture.

Case 4: Macroblock of B Picture is in Frame Mode and Co-Located Macroblock of List 1 Reference Picture is in Field Mode FIGS. 9A to 9(C) show cases where the macroblock of the B picture is in the frame mode and the co-located macroblock of the list 1 reference picture is in the field mode. Here, letting the vertical coordinate of the current macroblock be $y_{current}$ and the vertical coordinate of the co-located macroblock of the list 1 reference picture be $y_{co\text{-}located}$, the relation of $y_{co\text{-}located}=y_{current}/2$ is established between the two coordinates. Also, because the field 0 of the list 1 reference frame is temporally closer to the B picture than the field 1 thereof, motion information of a co-located block of the field 0 is used for calculation of the direct mode motion vectors.

If the list 0 and list 1 reference pictures for the direct mode are located temporally before and after the B picture, respectively FIG. 9(A), or if both the list 0 and list 1 reference pictures for the direct mode are located temporally after the B picture and the list 0 reference picture temporally follows the list 1 reference picture (FIG. 9(B)), the direct mode list 0 and list 1 motion vectors $MV_F$ and $MV_B$ of the B frame are calculated as follows:

$$MV_F=TD_B\times MV_0/TD_{D,0}$$

$$MV_B=(TD_B-TD_{D,0})\times MV_0/TD_{D,0}$$

The above equation may be expressed as follows:

$$Z=-TD_B\times 256/TD_{D,0} \quad MV_F=(Z\times MV_0+128)>>8$$

$$W=Z-256 \quad MV_B=(W\times MV_0+128)>>8$$

If, because the co-located block of the field 0 of the list 1 reference frame has a motion vector pointing to a field of a frame temporally following the B picture, both the list 0 and list 1 reference pictures for the direct mode are located temporally after the B picture and the list 0 reference picture temporally precedes the list 1 reference picture FIG. 9(C)), the direct mode list 0 and list 1 motion vectors $MV_F$ and $MV_B$ are calculated as follows:

$$MV_F=-TD_B\times MV_0/TD_{D,0}$$

$$MV_B=-(TD_B+TD_{D,0})\times MV_0/TD_{D,0}$$

The above equation may be expressed as follows:

$$Z=-TD_B\times 256/TD_{D,0} \quad MV_F=(Z\times MV_0+128)>>8$$

$$W=Z-256 \quad MV_B=(W\times MV_0+128)>>8$$

where, $TD_B$ represents a temporal distance between the current B frame and the list 0 reference frame, $TD_{D,0}$ represents a temporal distance between a field 0 of the list 1 reference frame and the list 0 reference field, and $MV_0$ represents a motion vector of the co-located block in the field 0 of the list 1 reference frame for direct mode.

[3] Cases where List 1 Reference Picture for Direct Mode Temporally Precedes B Picture In this case, both the list 0 and list 1 reference pictures are located temporally before the B picture.

Case 1: Both Macroblock of B Picture and Co-Located Macroblock of List 1 Reference Picture are in Frame Mode As seen from FIGS. 4(A) to 4(H), the co-located block in the list 1 reference picture can have one motion vector or two motion vectors. In the present invention, if the co-located block has two motion vectors, one (L0 MV or L1 MV) of the two motion vectors is selected and direct mode motion vectors are derived from the selected motion vector (this will hereinafter be described on the basis of the case where L0 MV (list 0 motion vector) is selected).

Figure 10:
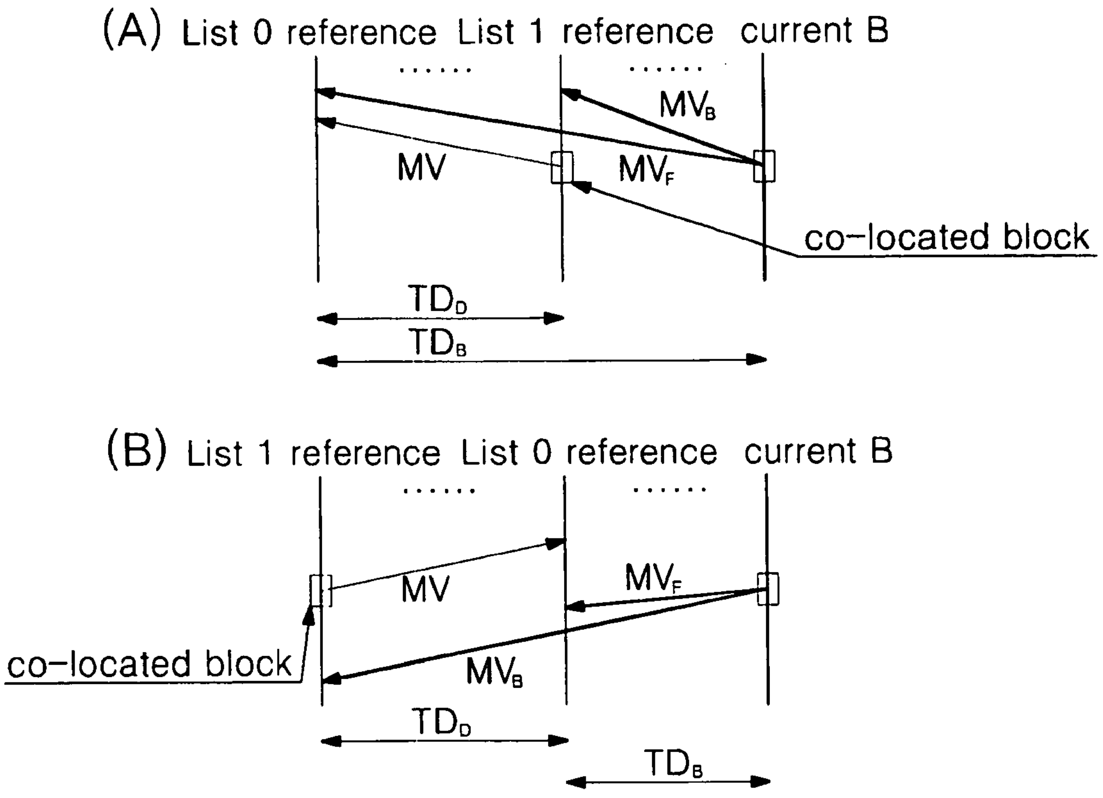
FIGS. 10(A) and 10(B) are views illustrating cases where both a macroblock of a B picture and a co-located macroblock in a list 1 reference picture for direct mode are in a frame mode and the list 1 reference picture temporally precedes the B picture.

Accordingly, FIGS. 4(A), 4(C), 4(E), 4(G) and 4(H) can be simply depicted as FIG. 10(A), and FIGS. 4(B) and 4(D) as FIG. 10(B), respectively.

If the list 0 reference picture for direct mode temporally precedes the list 1 reference picture for direct mode, direct mode motion vectors $MV_F$ and $MV_B$ are calculated as follows (FIG. 10(A)):

$$MV_F=TD_B\times MV/TD_D$$

$$MV_B=(TD_B-TD_D)\times MV/TD_D$$

where, $TD_B$ represents a temporal distance between a current B frame and a list 0 reference frame, $TD_D$ represents a temporal distance between a list 1 reference frame and the list 0 reference frame, and MV represents a motion vector of the co-located block in the list 1 reference picture for direct mode.

The above equation may be expressed as follows:

$$Z=-TD_B\times 256/TD_D \quad MV_F=(Z\times MV+128)>>8$$

$$W=Z-256 \quad MV_B=(W\times MV+128)>>8$$

If the list 0 reference picture temporally follows the list 1 reference picture, the direct mode motion vectors $MV_F$ and $MV_B$ are calculated as follows (FIG. 10(B)):

$$MV_F=-TD_B\times MV/TD_D$$

$$MV_B=-(TD_B+TD_D)\times MV/TD_D$$

This equation may be expressed as follows:

$$Z=-TD_B\times 256/TD_D \quad MV_F=(Z\times MV+128)>>8$$

$$W=Z-256 \quad MV_B=(W\times MV+128)>>8$$

where, $TD_B$ represents a temporal distance between the current B frame and the list 0 reference frame, $TD_D$ represents a temporal distance between the list 1 reference frame and the list 0 reference frame, and MV represents a motion vector of the co-located block in the list 1 reference picture for direct mode.

Case 2: Both Macroblock of B Picture and Co-Located Macroblock of List 1 Reference Picture are in Field Mode If the list 0 reference picture for direct mode temporally precedes the list 1 reference picture for direct mode, direct mode list 0 and list 1 motion vectors $MV_{F,i}$ and $MV_{B,i}$ for each field i of a B frame are calculated as follows (FIGS. 11(A) and 11(B)):

$$MV_{F,i}=TD_{B,i}\times MV_i/TD_{D,i}$$

$$MV_{B,i}=(TD_{B,i}-TD_{D,i})\times MV_i/TD_{D,i}$$

The above equation may be expressed as follows:

$$Z=-TD_{B,i}\times 256/TD_{D,i}\ MV_{F,i}=(Z\times MV_i+128)>>8$$

$$W=Z-256\ MV_{B,i}=(W\times MV_i+128)>>8$$

where, $TD_{B,i}$ represents a temporal distance between a current B field and a list 0 reference field, $TD_{D,i}$ represents a temporal distance between a list 1 reference field and the list 0 reference field, and $MV_i$ represents a motion vector of a co-located block in a list 1 reference field for direct mode.

Figure 11:
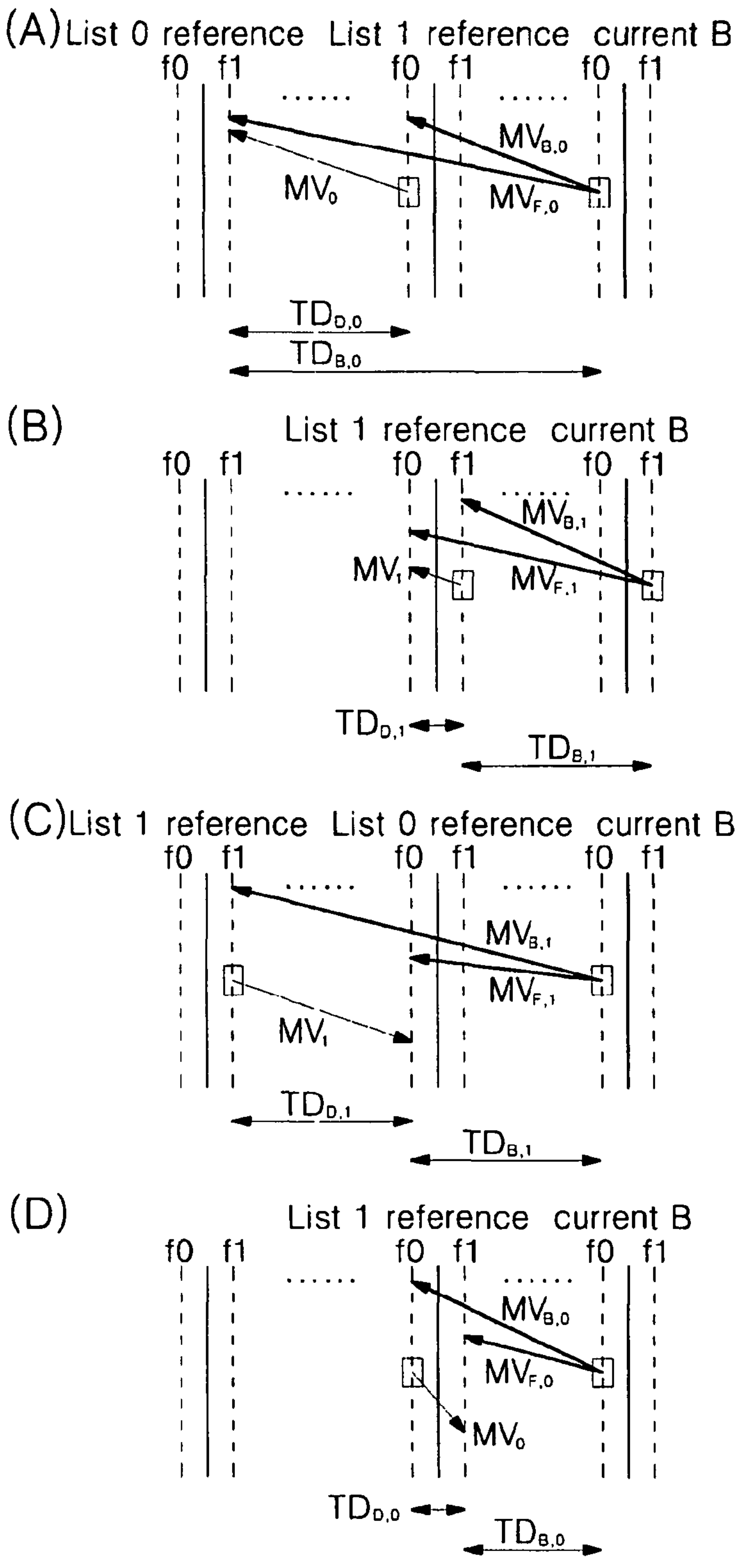
FIGS. 11(A) to 11(D) are views illustrating cases where both a macroblock of a B picture and a co-located macroblock in a list 1 reference picture for direct mode are in a field mode and the list 1 reference picture temporally precedes the B picture.

If, because the co-located block of the field i in the list 1 reference frame has a motion vector pointing to a field in a temporally following frame, the list 0 reference picture temporally precedes the list 1 reference picture, the direct mode list 0 and list 1 motion vectors $MV_{F,i}$ and $MV_{B,i}$ are calculated as follows (FIGS. 11(C) and 11(D)):

$$MV_{F,i}=TD_{B,i}\times MV_i/TD_{D,i}$$

$$MV_{B,i}=(TD_{B,i}-TD_{D,i})\times MV_i/TD_{D,i}$$

The above equation may be expressed as follows:

$$Z=-TD_{B,i}\times 256/TD_{D,i}\ MV_{F,i}=(Z\times MV_i+128)>>8$$

$$W=Z-256\ MV_{B,i}=(W\times MV_i+128)>>8$$

where, $TD_{B,i}$ represents a temporal distance between the current B field and the list 0 reference field, $TD_{D,i}$ represents a temporal distance between the list 1 reference field and the list 0 reference field, and $MV_i$ represents a motion vector of the co-located block in the list 1 reference field for direct mode.

Case 3: Macroblock of B Picture is in Field Mode and Co-Located Macroblock of List 1 Reference Picture is in Frame Mode If the list 0 reference picture for direct mode temporally precedes the list 1 reference picture for direct mode, the direct mode list 0 and list 1 motion vectors $MV_{F,i}$ and $MV_{B,i}$ for each field i of the B frame are calculated as follows (FIG. 12(A):

$$MV_{F,i}=TD_{B,i}\times MV/TD_D$$

$$MV_{B,i}=(TD_{B,i}-TD_D)\times MV/TD_D$$

The above equation may be expressed as follows:

$$Z=-TD_{B,i}\times 256/TD_D\ MV_{F,i}=(Z\times MV+128)>>8$$

$$W=Z-256\ MV_{B,i}=(W\times MV+128)>>8$$

where, $TD_{B,i}$ represents a temporal distance between the current B field and the list 0 reference field, $TD_D$ represents a temporal distance between the list 1 reference frame and the list 0 reference frame, and MV represents a motion vector of the co-located block in the list 1 reference frame for direct mode.

If, because the co-located block in the list 1 reference frame has a motion vector pointing to a temporally following frame, the list 0 reference picture temporal follows the list 1 reference picture, the direct mode list 0 and list 1 motion vectors $MV_{F,i}$ and $MV_{B,i}$ for each field i of the B frame are calculated as follows (FIG. 12(B)):

$$MV_{F,i}=TD_{B,i}\times MV/TD_D$$

$$MV_{B,i}=(TD_{B,i}-TD_D)\times MV/TD_D$$

The above equation may be expressed as follows:

$$Z=-TD_{B,i}\times 256/TD_D\ MV_{F,i}=(Z\times MV+128)>>8$$

$$W=Z-256\ MV_{B,i}=(W\times MV+128)>>8$$

where, $TD_{B,i}$ represents a temporal distance between the current B field and the list 0 reference field, $TD_D$ represents a temporal distance between the list 1 reference frame and the list 0 reference frame, and MV represents a motion vector of the co-located block in the list 1 reference frame for direct mode.

Case 4: Macroblock of B Picture is in Frame Mode and Co-Located Macroblock of List 1 Reference Picture is in Field Mode Because the field 1 f1 of the list 1 reference frame is temporally closer to the B picture than the field 0 f0 thereof, motion information of a co-located block of the field 1 f1 is used for calculation of the direct mode motion vectors.

If the list 0 reference picture for direct mode temporally precedes the list 1 reference picture for direct mode, the direct mode list 0 and list 1 motion vectors $MV_F$ and $MV_B$ for each field i of the B frame are calculated as follows (FIG. 13(A):

$$MV_F=TD_B\times MV_1/TD_{D,1}$$

$$MV_B=(TD_B-TD_{D,1})\times MV_1/TD_{D,1}$$

The above equation may be expressed as follows:

$$Z=-TD_B\times 256/TD_{D,1}\ MV_F=(Z\times MV_1+128)>>8$$

$$W=Z-256\ MV_B=(W\times MV_1+128)>>8$$

where, $TD_B$ represents a temporal distance between the current B frame and the list 0 reference frame, $TD_{D,1}$ represents a temporal distance between a field 1 of the list 1 reference frame and the list 0 reference field, and $MV_1$ represents a motion vector of the co-located block in the field 1 of the list 1 reference frame for direct mode.

If, because the co-located block of the field 1 f1 of the list 1 reference frame has a motion vector pointing to a field of a temporally following frame, the list 0 reference picture temporally follows the list 1 reference picture, the direct mode list 0 and list 1 motion vectors $MV_F$ and $MV_B$ are calculated as follows (FIG. 13(B)):

$$MV_F=TD_B\times MV_1/TD_{D,1}$$

$$MV_B=(TD_B-TD_{D,1})\times MV_1/TD_{D,1}$$

The above equation may be expressed as follows:

$$Z=-TD_B\times 256/TD_{D,1}\ MV_F=(Z\times MV_1+128)>>8$$

$$W=Z-256\ MV_B=(W\times MV_1+128)>>8$$

where, $TD_B$ represents a temporal distance between the current B frame and the list 0 reference frame, $TD_{D,1}$ represents a temporal distance between a field 1 of the list 1 reference frame and the list 0 reference field, and $MV_1$ represents a motion vector of the co-located block in the field 1 of the list 1 reference frame for direct mode.

[4] Cases where Direct Mode Motion Vectors are Calculated by Assigning Sign to Inter-Picture Temporal Distance Value In case the list 1 reference picture for direct mode is located temporally before or after the B picture, two types of algorithms are given in each case. Such algorithms can be simply expressed by assigning a sign to an inter-picture temporal distance value, as follows.

Case 1: Both Macroblock of B Picture and Co-Located Macroblock of List 1 Reference Picture are in Frame Mode If both the macroblock of the B picture and the co-located macroblock of the list 1 reference picture are in the frame mode, the direct mode motion vectors $MV_F$ and $MV_B$ of the B picture can be calculated as follows:

$$MV_F=TD_B\times MV/TD_D$$

$$MV_B=(TD_B-TD_D)\times MV/TD_D$$

or $$Z=-TD_B\times 256/TD_D \quad MV_F=(Z\times MV+128)>>8$$

$$W=Z-256 \quad MV_B=(W\times MV+128)>>8$$

where, $TD_B$ represents a temporal distance between a current B frame and a list 0 reference frame, which is assigned a positive (+) sign if it is measured from the B frame and a negative (−) sign if it is measured from the list 0 reference frame, $TD_D$ represents a temporal distance between a list 1 reference frame and the list 0 reference frame, which is assigned a positive (+) sign if it is measured from the list 1 reference frame and a negative (−) sign if it is measured from the list 0 reference frame, and MV represents a motion vector of the co-located block in the list 1 reference picture for direct mode.

Case 2: Both Macroblock of B Picture and Co-Located Macroblock of List 1 Reference Picture are in Field Mode If both the macroblock of the B picture and the co-located macroblock of the list 1 reference picture are in the field mode, the direct mode motion vectors $MV_{F,i}$ and $MV_{B,i}$ for each field i of the B frame can be calculated as follows:

$$MV_{F,i}=TD_{B,i}\times MV_i/TD_{D,i}$$

$$MV_{B,i}=(TD_{B,i}-TD_{D,i})\times MV_i/TD_{D,i}$$

or $$Z=-TD_{B,i}\times 256/TD_{D,i} \quad MV_{F,i}=(Z\times MV_i+128)>>8$$

$$W=Z-256 \quad MV_{B,i}=(W\times MV_i+128)>>8$$

where, $TD_{B,i}$ represents a temporal distance between a current B field and a list 0 reference field, which is assigned a positive (+) sign if it is measured from the B field and a negative (−) sign if it is measured from the list 0 reference field, $TD_{D,i}$ represents a temporal distance between a list 1 reference field and the list 0 reference field, which is assigned a positive (+) sign if it is measured from the list 1 reference field and a negative (−) sign if it is measured from the list 0 reference field, and $MV_i$ represents a motion vector of a co-located block in a list 1 reference field for direct mode.

Case 3: Macroblock of B Picture is in Field Mode and Co-Located Macroblock of List 1 Reference Picture is in Frame Mode If the macroblock of the B picture is in the field mode and the co-located macroblock of the list 1 reference picture is in the frame mode, the direct mode motion vectors $MV_{F,i}$ and $MV_{B,i}$ for each field i of the B frame can be calculated as follows:

$$MV_{F,i}=TD_{B,i}\times MV/TD_D$$

$$MV_{B,i}=(TD_{B,i}-TD_D)\times MV/TD_D$$

or $$Z=-TD_{B,i}\times 256/TD_D \quad MV_{F,i}=(Z\times MV+128)>>8$$

$$W=Z-256 \quad MV_{B,i}=(W\times MV+128)>>8$$

where, $TD_{B,i}$ represents a temporal distance between the current B field and the list 0 reference field, which is assigned a positive (+) sign if it is measured from the B field and a negative (−) sign if it is measured from the list 0 reference field, $TD_D$ represents a temporal distance between the list 1 reference frame and the list 0 reference frame, which is assigned a positive (+) sign if it is measured from the list 1 reference frame and a negative (−) sign if it is measured from the list 0 reference frame, and MV represents a motion vector of the co-located block in the list 1 reference frame for direct mode.

Case 4: Macroblock of B Picture is in Frame Mode and Co-Located Macroblock of List 1 Reference Picture is in Field Mode If the macroblock of the B picture is in the frame mode, the co-located macroblock of the list 1 reference picture is in the field mode and the list 1 reference picture temporally follows the B picture, the field 0 of the list 1 reference frame is temporally closer to the B picture than the field 1 thereof, so motion information of a co-located block of the field 0 is used for calculation of the direct mode motion vectors. As a result, the direct mode motion vectors $MV_F$ and $MV_B$ of the B frame can be obtained from the below equation where the motion information of the co-located block in the field 0 of the list 1 reference frame is used for calculation of the direct mode motion vectors:

$$MV_F=TD_B\times MV_0/TD_{D,0}$$

$$MV_B=(TD_B-TD_{D,0})\times MV_0/TD_{D,0}$$

or $$Z=-TD_B\times 256/TD_{D,0} \quad MV_F=(Z\times MV_0+128)>>8$$

$$W=Z-256 \quad MV_B=(W\times MV_0+128)>>8$$

where, $TD_B$ represents a temporal distance between the current B frame and the list 0 reference frame, which is assigned a positive (+) sign if it is measured from the B frame and a negative (−) sign if it is measured from the list 0 reference frame, $TD_{D,0}$ represents a temporal distance between a field 0 of the list 1 reference frame and the list 0 reference field, which is assigned a positive (+) sign if it is measured from the field 0 of the list 1 reference frame and a negative (−) sign if it is measured from the list 0 reference field, and $MV_0$ represents a motion vector of the co-located block in the field 0 of the list 1 reference frame for direct mode.

If the list 1 reference picture temporally precedes the B picture, the field 1 of the list 1 reference frame is temporally closer to the B picture than the field 0 thereof, so motion information of a co-located block of the field 1 is used for calculation of the direct mode motion vectors. As a result, the direct mode motion vectors $MV_F$ and $MV_B$ of the B frame can be obtained from the below equation where the motion information of the co-located block in the field 1 of the list 1 reference frame is used for calculation of the direct mode motion vectors:

$$MV_F=TD_B\times MV_1/TD_{D,1}$$

$$MV_B=(TD_B-TD_{D,1})\times MV_1/TD_{D,1}$$

or $$Z=-TD_B\times 256/TD_{D,1}\ MV_F=(Z\times MV_1+128)>>8$$

$$W=Z-256\ MV_B=(W\times MV_1+128)>>8$$

where, $TD_B$ represents a temporal distance between the current B frame and the list 0 reference frame, which is assigned a positive (+) sign if it is measured from the B frame and a negative (−) sign if it is measured from the list 0 reference frame, $TD_{D,1}$ represents a temporal distance between a field 1 of the list 1 reference frame and the list 0 reference field, which is assigned a positive (+) sign if it is measured from the field 1 of the list 1 reference frame and a negative (−) sign if it is measured from the list 0 reference field, and $MV_1$ represents a motion vector of the co-located block in the field 1 of the list 1 reference frame for direct mode.

As apparent from the above description, the present invention provides a method for calculating direct mode motion vectors of a B (Bi-predictive) picture defined in a next-generation moving picture compression technique. A technique for extracting the direct mode motion vectors of the B picture is proposed to raise the probability that a direct mode will be selected as a predictive mode of a macroblock thereby improving a B picture coding efficiency.

As further described with respect to the above embodiments, a method for determining motion vectors of a B (Bi-predictive) picture includes, if a co-located block in a list 1 reference picture for direct mode has two motion vectors, selecting one (a list 0 motion vector or list 1 motion vector) of the two motion vectors, and deriving the direct mode motion vectors of the B picture from the selected motion vector.

The one of the list 0 and list 1 motion vectors, which points to a picture temporally closer to the list 1 reference picture for direct mode, may be selected as the motion vector for derivation of the direct mode motion vectors, or the list 0 motion vector may be selected as the motion vector for derivation of the direct mode motion vectors if the two motion vectors point to the same reference picture. The direct mode motion vectors may then be derived as discussed in detail above using the selected motion vector.

However, instead of selecting between the list 1 and list 0 motion vectors of the co-located block, the list 0 motion vector may be unconditionally selected as the motion vector for derivation of the direct mode motion vectors. Namely, if both the list 0 and list 1 motion vectors of the co-located block exist, the list 0 motion vector is selected as the motion vector for derivation of the direct mode motion vectors. Accordingly, in this embodiment, the list 0 motion vector is selected regardless of whether a list 1 motion vector is present. Stated another way, the list 0 motion vector is selected regardless of the prediction modes of the co-located block. The direct mode motion vectors may then be derived as discussed in detail above using the selected motion vector.

Also, according to another embodiment, one of the motion vectors of the co-located block in the list 1 reference picture for direct mode may be selected as the motion vector for derivation of the direct mode motion vectors regardless of modes (a list 0 mode and/or a list 1 mode) of the motion vectors of the co-located block. The direct mode motion vectors may then be derived as discussed in detail above using the selected motion vector.

In a further alternative embodiment, if a co-located block in a list 1 reference picture for dire mode has only a list 1 motion vector, the list 1 motion vector of the co-located block is selected and used as the motion vector for derivation of the direct mode motion vectors. The direct mode motion vectors may then be derived as discussed in detail above using the selected motion vector.

The embodiments of the present invention may further include determining the list 0 reference picture for direct mode as a reference picture referenced by the co-located block. The co-located block may include reference information referencing a reference picture. For example, the selected motion vector may point to a reference picture, and this reference picture may be selected as the list 0 reference picture for direct mode.

Alternatively, a decoded picture located temporally just before the B picture may be determined as the list 0 reference picture for direct mode.

Although example embodiments of the present invention have been disclosed for illustrative purposes, those skilled in the art will appreciate that various modifications, additions and substitutions are possible, without departing from the scope and spirit of the invention.

What is claimed is:

1. A method of deriving a list 0 and list 1 motion vectors of a bi-predictive block in a current picture from a motion vector of a co-located block in a first reference picture, performed by a moving picture coding system, comprising:

selecting, by the moving picture coding system, a list 0 motion vector of the co-located block in the first reference picture as the motion vector for deriving the list 0 and the list 1 motion vectors of the bi-predictive block regardless of whether the co-located block has a list 1 motion vector if the co-located block has the list 0 motion vector, the first reference picture being a type of reference picture permitted to be located temporally before or after the current picture;

deriving, by the moving picture coding system, a first temporal distance between the current picture and the second reference picture which is referred by the co-located block in the first reference picture;

deriving, by the moving picture coding system, a second temporal distance between the first reference picture and the second reference picture;

scaling, by the moving picture coding system, the selected list 0 motion vector of the co-located block based on the first and second temporal distances; and deriving, by the moving picture coding system, the list 0 and the list 1 motion vectors of the bi-predictive block based on the scaled list 0 motion vector of the co-located block.

* * * * *